United States Patent [19]

Stuart

[11] Patent Number: 4,969,662
[45] Date of Patent: Nov. 13, 1990

[54] ACTIVE DAMPING SYSTEM FOR AN AUTOMOBILE SUSPENSION

[75] Inventor: Keith O. Stuart, Cypress, Calif.
[73] Assignee: Aura Systems, Inc., El Segundo, Calif.
[21] Appl. No.: 363,502
[22] Filed: Jun. 8, 1989
[51] Int. Cl.⁵ ............................................. B60G 11/26
[52] U.S. Cl. ..................................... 280/707; 280/710; 188/267
[58] Field of Search ................. 280/707, 710; 188/267

[56] References Cited

U.S. PATENT DOCUMENTS

| | | | |
|---|---|---|---|
| 3,443,528 | 5/1969 | Lipsius et al. | 188/267 |
| 3,770,290 | 11/1973 | Bottalico | 188/267 |
| 4,351,515 | 9/1982 | Yoshida | 188/267 |
| 4,624,435 | 11/1986 | Freudenberg | 188/267 |
| 4,793,599 | 12/1988 | Ishioka | 188/267 |

Primary Examiner—Kenneth R. Rice
Attorney, Agent, or Firm—Poms, Smith, Lande & Rose

[57] ABSTRACT

The active damping system includes an electrical current conductive coil spatially fixed with respect to one of the sprung mass and unsprung mass of a vehicle and a magnetic element spatially fixed with respect to the other of the sprung mass and the unsprung mass. Relative motion is imparted between the coil and the magnetic element in response to relative motion between the sprung mass and the unsprung mass. This relative motion is in response to random input vibrations from a road surface. The magnetic element develops a magnetic flux intersecting the coil to develop and induced current through the coil wherein the induced current develops an electromotive force on the magnetic element opposing the relative motion to act as the active damping element. The active damping system also includes means for developing a control current through the coil to oppose motion of the sprung mass relative to the road surface occurring below a selected frequency.

21 Claims, 5 Drawing Sheets

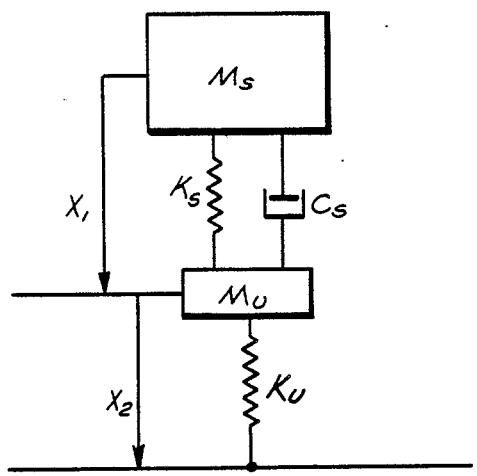
FIG. 1 (PRIOR ART)
FIG. 2
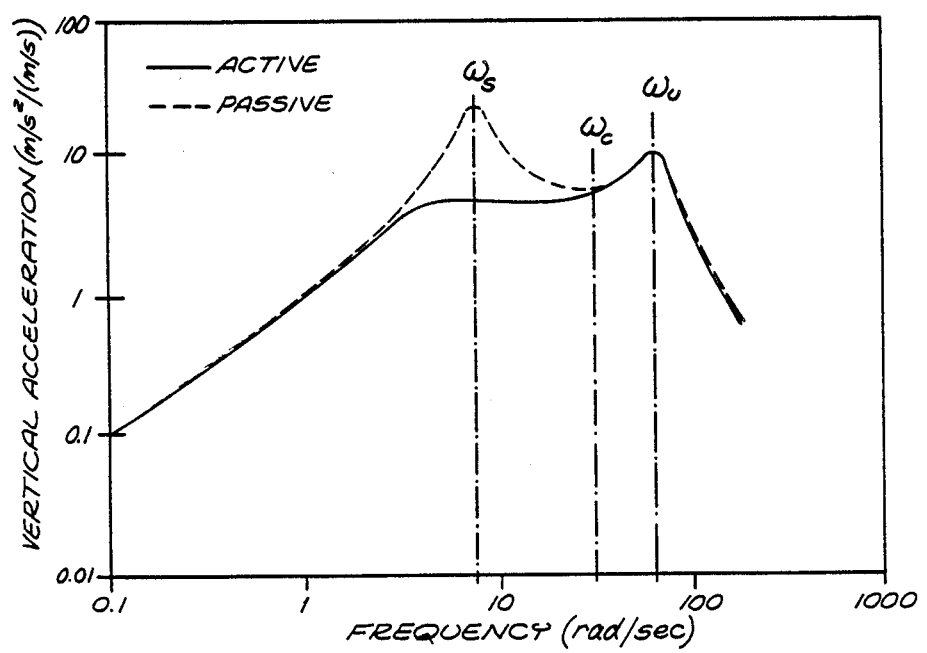

ACTIVE DAMPING SYSTEM FOR AN AUTOMOBILE SUSPENSION

FIELD OF THE INVENTION

The present invention relates generally to automobile suspensions and more particularly to a novel active damping system for use in such suspensions.

BACKGROUND OF THE INVENTION

Referring now to prior art FIG. 1, there is shown a quarter car model of a passively suspended vehicle. The portion of the sprung mass corresponding to one corner of the vehicle is represented by the mass, $M_s$, and the unsprung mass of the combined tire and hub assembly wheel at one corner by the mass, $M_u$. The suspension is modeled as a linear spring having a spring constant, $K_s$, and a linear damper having a damping rate, $C_s$. The tire is represented by a spring stiffness, $K_u$. Since the damping in the tire is typically very small it may be neglected. It may be assumed that the tire acts as a point contact follower that is in contact with the road at all times.

The vehicle is assumed to travel at a constant forward velocity over a random road surface. Road measurements have shown that accept at very low frequencies, the road profile (vertical displacement of the road surface) can be reasonably well approximated by an integrated white nose input. Hence, the vertical velocity at the tire-road interface may be modeled as a white nose input.

In the above quarter car model, the principle areas of analytical interest are vibration isolation, suspension travel and road holding characteristics of the vehicle. In performing the analysis of these characteristics, the vehicle response variables that need to be examined are the deflection of the sprung mass from the unsprung mass, $x_1$, the deflection of the unsprung mass from the road surface, $x_2$, and the vertical acceleration of the sprung mass, $d^2(x_1+x_2)/dt^2$. The rms vertical acceleration of the sprung mass may be used as a measure of the vibration level.

In the passively suspended vehicle based on the model of FIG. 1, the only suspension parameters that can be changed are the stiffness of the spring, $K_s$, and damping rate, $C_s$, respectively. By replacing the spring and damper shown in prior art FIG. 1 with a totally active system, four suspension parameters may as a result be controlled. In addition to active control of the spring constant between the sprung and unsprung masses (affecting the natural frequency of the sprung mass) and the active control of the absolute velocity of the sprung mass (affecting the damping), active control of the tire deflection (affecting the wheel hop frequency) and the velocity of the unsprung mass which affects the damping of the wheel hop mode) may also be provided. In the active suspension the damping of the sprung and unsprung mass modes can be specified independently. In contrast thereto, changes to the damping in the passive suspension affects the damping of both modes simultaneously.

Referring now to FIG. 2, there are shown two acceleration response curves of the vertical acceleration of the sprung mass plotted as a function of the frequency of the white noise input vibrations. FIG. 2 is obtained from R. M. Chalasani, Ride Performance Potential of Active Suspension Systems, Part I, Simplified Analysis Based On A Quarter Car Model, Power Systems Research Department, General Motors Research Laboratories, pp. 187-204. In Chalasani, an analysis and comparison is made between the quarter car model of the passive suspension of FIG. 1 and the quarter car mode of an ideal active suspension. FIG. 2 is but one result of the analysis. The acceleration response curves of the sprung mass shown in FIG. 2 indicate that the principle difference in system response between the purely active and the purely passive configurations occurs typically in the frequency range of 4 to 25 rad/sec (0.7 to 4 Hz). These numerical values were obtained using values for sprung mass, unsprung mass, spring constants and damping typically associated with softly sprung, lightly damped "family-type" vehicles.

The lightly damped passive suspension exhibits resonances at the sprung and unsprung mass natural frequencies, $\omega_s$ and $\omega_u$, respectively. The active suspension exhibits a well damp behavior near the sprung mass natural frequency, $\omega_s$, and a lightly damp behavior, similar to the passive suspension at the unsprung natural frequency $\omega_u$. Since the rms vertical acceleration of the sprung mass is the measure of vibration level, most of the improvement in vibration isolation occurs in the low frequency range below 25 rad/sec. (4 Hz). FIG. 3 qualitatively illustrates that this frequency may be represented by a crossover frequency, $\omega_c$, between body motion and wheel motion compensation concerns in the suspension. Generally, the crossover frequency, $\omega_c$, lies between the natural frequencies, $\omega_s$ and $\omega_u$, of the sprung and unsprung mass.

In U.S. patent application Ser. No. 07/238,925, filed Aug. 31, 1988, an assigned to the assignee of the present application, there is described a novel electromagnetic linear actuator and an exemplary use of the actuator in an electromagnetic strut assembly. As described therein, a corrective current is applied to the coil of the linear actuator, wherein the control current affects the entire frequency range. It has been found that the system as described in the abovereference application can achieve a 15% improvement over a purely passive suspension system for road input frequencies above 4 Hz assuming an unlimited bandwidth of the control system. For practical applications, as is found in the Chalasani paper, this improvement becomes negligible.

SUMMARY OF THE INVENTION

It is therefore a feature of the present invention which provides for an active damping system which retains the advantages of an active suspension system below the above described crossover frequency while retaining the simplified attributes of the passive suspension system above such frequency. A particular advantage thereof is that the active damping system may have lesser power requirements, be simpler and have lower cost than a purely active suspension.

According to the present invention, the active damping system includes an electrical current conductive coil spatially fixed with respect to one of the sprung mass and unsprung mass of a vehicle and a magnetic element spatially fixed with respect to the other of the sprung mass and the unsprung mass. Relative motion is imparted between the coil and the magnetic element in response to relative motion between the sprung mass and the unsprung mass induced in response to random input vibrations from a road surface. The magnetic element develops a magnetic flux intersecting the coil to develop an induced current through the coil wherein the induced current develops an electromotive force on the magnetic element opposing the relative motion to act as the active damping element. The active damping system also includes means for developing a control current through the coil to oppose motion of the sprung mass relative to the road surface occurring below a selected frequency such as the crossover frequency. The electromotive force acting on the magnetic element is proportional to velocity of the sprung mass relative to the unsprung mass and is therefore a true damping force.

An advantage of the present invention is that the spring which supports the sprung mass on the unsprung mass may be retained such that a failure of the active damping system does not disable the vehicle.

These an other objects, advantages and features of the present invention will become apparent to those skilled in the art from a study of the following description of an exemplary preferred embodiment when read in conjunction with the attached drawings and appended claims.

BRIEF DESCRIPTION OF THE DRAWINGS

FIG. 1 schematically illustrates a quarter car model of a passively suspended vehicle;

FIG. 2 is a diagrammatic plot of vertical acceleration shown along the ordinate versus log of frequency in radians per second shown along the abscissa;

DESCRIPTION OF AN EXEMPLARY PREFERRED EMBODIMENT

Figure 3:
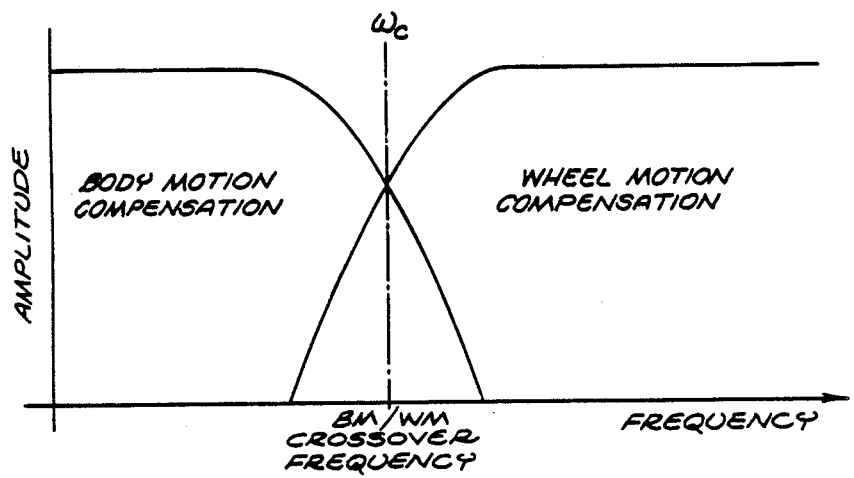
FIG. 3 qualitatively illustrates body motion compensation and wheel motion compensation along an ordinate versus frequency along an abscissa and further showing a crossover frequency.

Referring now to FIGS. 4–7, there is shown a vehicle 10 having four wheels 12 and a chassis 14. Interconnecting each wheel 12 to the chassis 14 is a strut assembly 16. Strut assembly 16 generally includes an upper mounting bracket 18 and a hub assembly 20. The upper mounting bracket 18 is adapted to be mounted to the chassis 14 of the vehicle 10 in a known manner. The wheel 12 is rotatably mounted to the hub assembly 20. Accordingly, the mass of each wheel 12 and the corresponding hub assembly 20 is generally defined as the unsprung mass of the vehicle. As used herein, wheel 12 includes both wheel and tire.

Strut assembly 16 also includes a spring 22 mounted between the upper mounting bracket 18 and the hub assembly 20. The spring 22 supports the entire remaining mass at each corner of the vehicle 10, this mass being generally referred to as the sprung mass.

Figure 6:
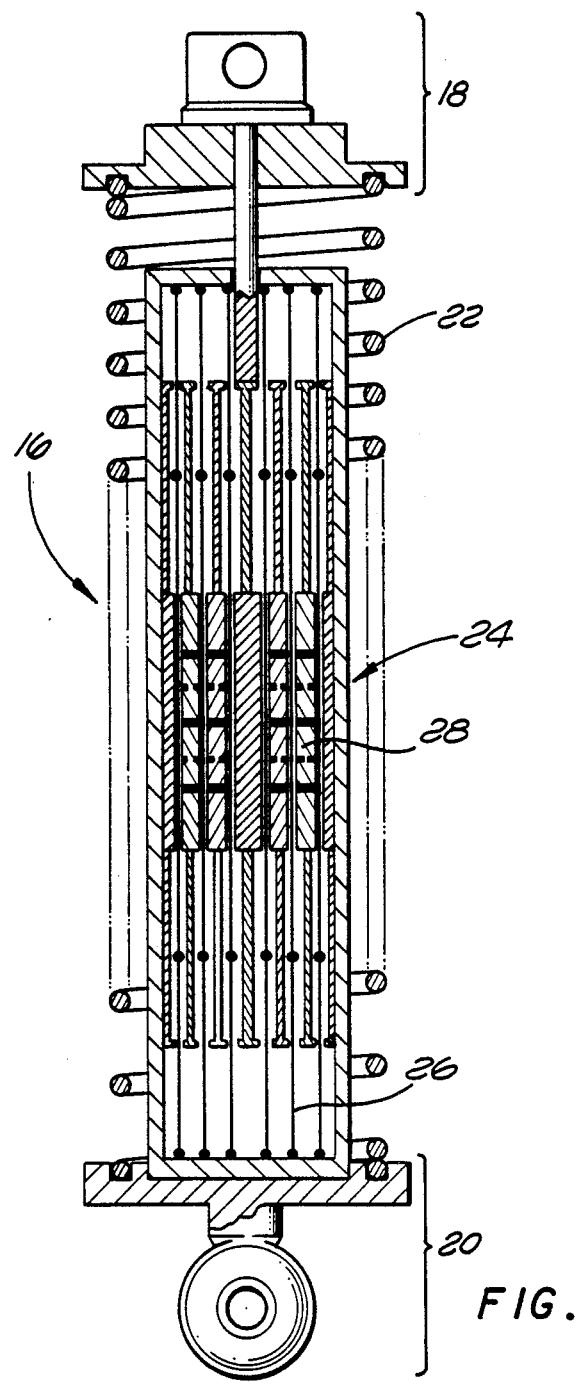
FIG. 6 is a more detailed representation of one strut shown in FIG. 5.

An active damping system 24 constructed in accordance with the principles of the present invention is shown incorporated within the strut assembly 16. The active damping system 24 includes at least one electrical current conductive coil 26 spatially fixed with respect to one of the sprung mass or the unsprung mass, and a magnetic element 28 spatially fixed with respect to the other of the sprung mass and unsprung mass. The magnetic element 28 develops a magnetic flux intersecting the coil 26. As best seen in FIG. 6, the coil 26 is affixed to the hub assembly 20, which forms part of the unsprung mass whereas the magnetic elements 28 are affixed to the upper mounting bracket 18 which is attached to the sprung mass, i.e. the remainder of the mass of the respective corner of the vehicle 10. A complete description of the construction of the strut assembly 16 including the coil 26 and magnetic element 28 is described in the above mentioned commonly-owned copending application Ser. No. 07/238,925, which is specifically incorporated herein by reference.

Figure 4:
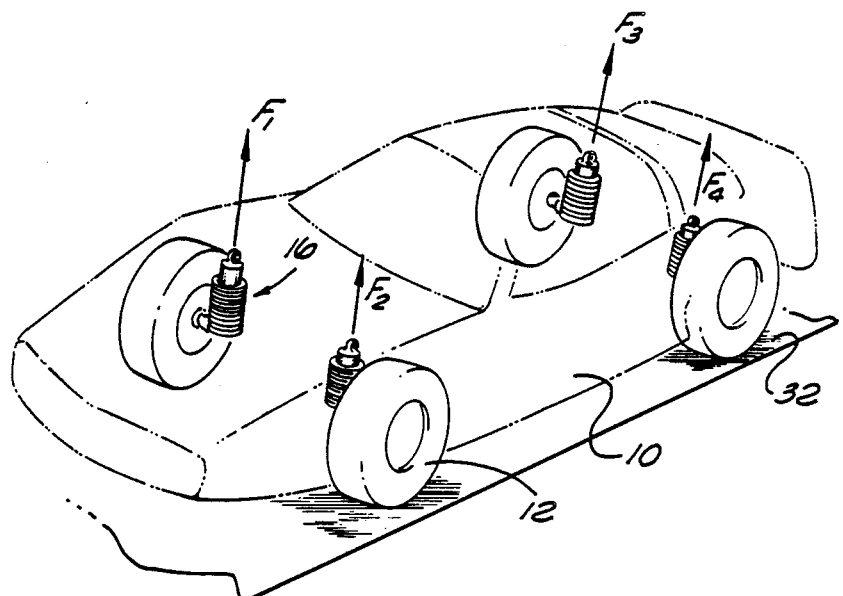
FIG. 4 diagrammatically illustrates body motion forces causing heave, pitch, roll and warp compensated for by the novel active damping system constructed in accordance with the principles of the present invention.
Figure 5:
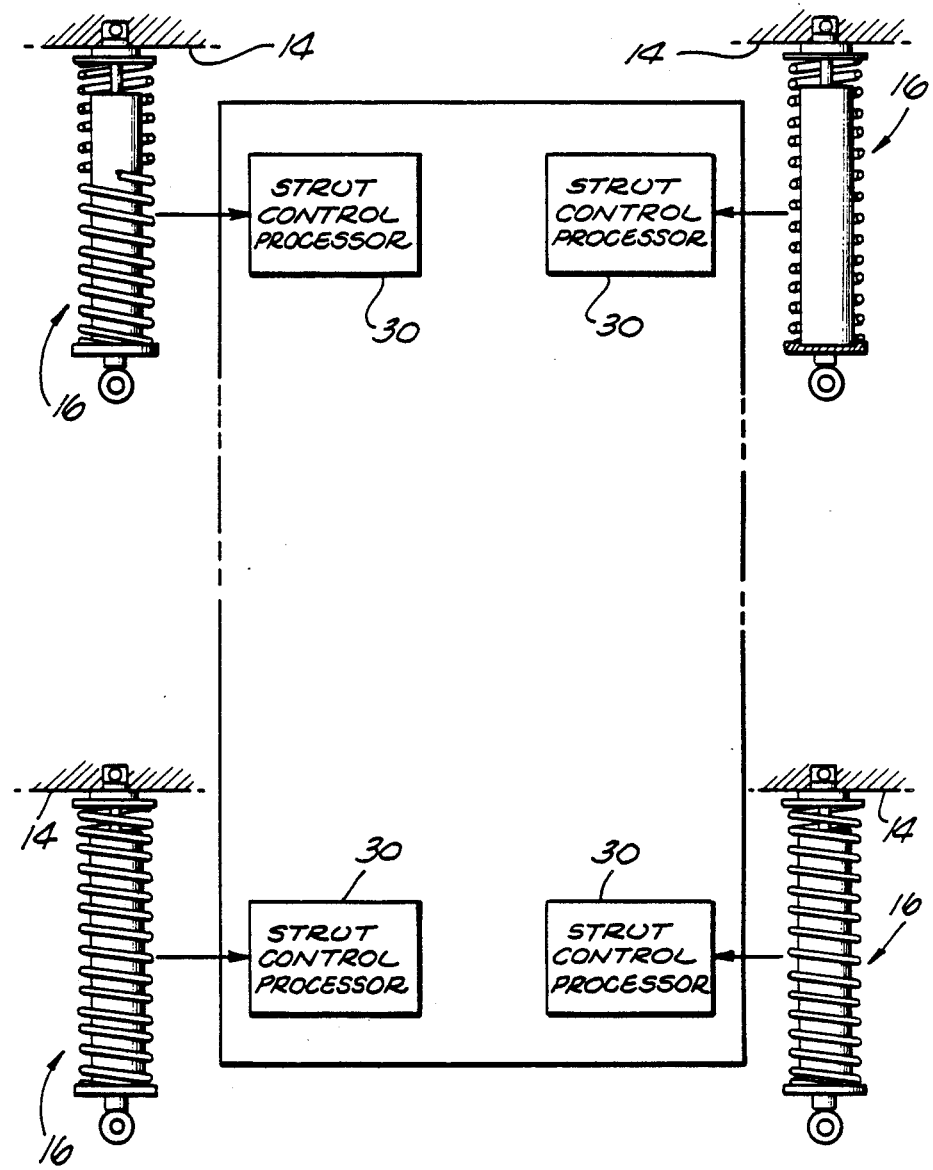
FIG. 5 is a schematic representation of the novel active damping system shown in FIG. 4.

With particular reference to FIG. 4, at the interface between strut 16 and the chassis 14 of the vehicle 10, there is shown four forces, $F_{1-4}$ which act on the sprung mass to produce the low frequency body motions to be corrected by the present invention. Generally these motions include heave, pitch, roll and warp. Heave occurs when forces $F_{1-4}$ are all in phase with each other. Pitch occurs when forces $F_1$ and $F_2$ are in phase with each other and out of phase with forces $F_3$ and $F_4$. Similarly, roll will occur when forces $F_1$ and $F_3$ are in phase with each other and out of phase with $F_2$ and $F_4$. Finally, warp is induced when $F_1$ and $F_4$ are in phase with each other and out of phase with $F_2$ and $F_3$.

Figure 7:
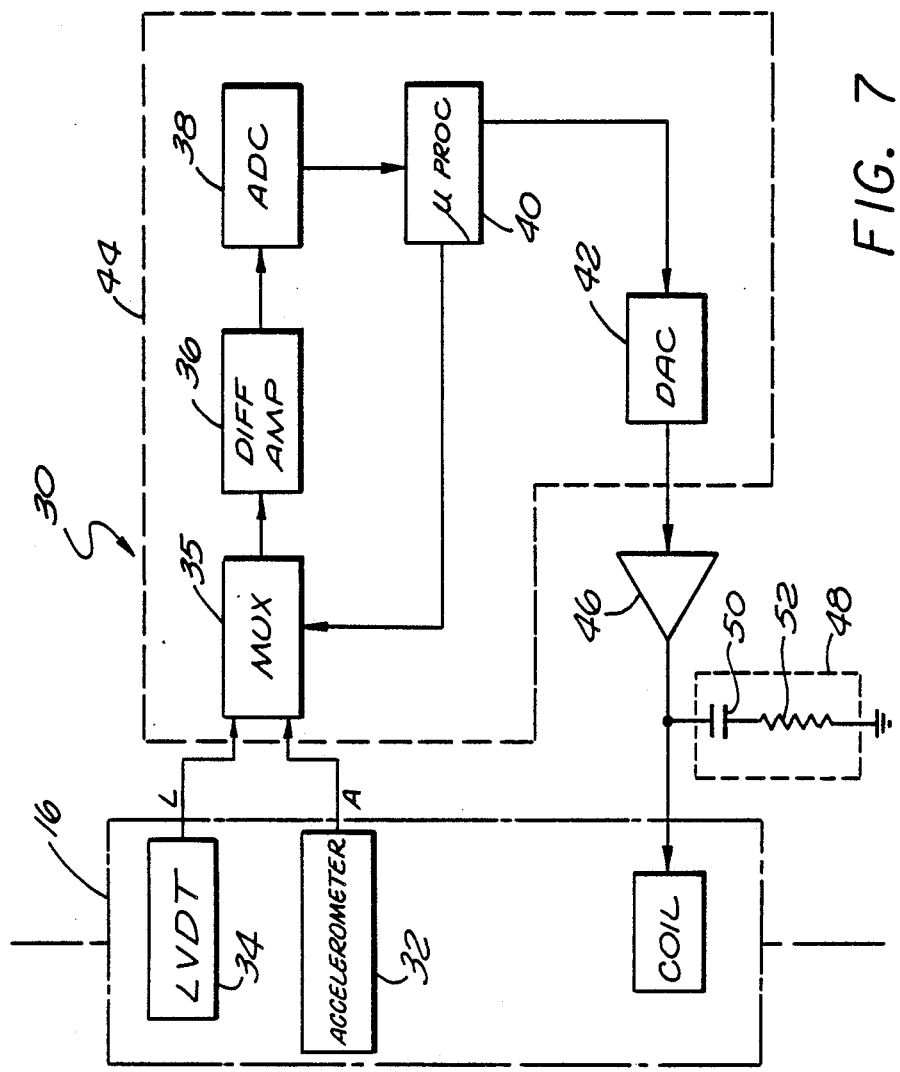
FIG. 7 is a schematic block diagram of the strut control processor shown in FIG. 5.

With further reference to FIG. 7, the active damping system 24 further includes means 30 for developing a control current through the coil 26 to oppose motion of the sprung mass relative to the road surface 32. A detailed description of the developing means 30 may be obtained from a study of commonly-owned Ser. No. 07/200,025, filed May 27, 1988, now U.S. Pat. No. 4,892,320.

Generally, the developing means 30 includes an accelerometer 32 and linear voltage differential transformer (LVDT) 34. The accelerometer 32 and the LVDT 34 may be included in the strut assembly 16 as disclosed in the above-referenced application Ser. No. 07/200,025. The developing means 30 also includes a multiplexer 35 from which the signals from each of the accelerometer 32 and the LVDT 34 are applied. The multiplexed signal developed by the multiplexer 35 is applied to a differential amplifier 36. The amplified signal is then applied to an analog to digital converter 38. The digital signal developed thereby is then applied to the microprocessor 40. The programming for the microprocessor 40 may be obtained from the above referenced application, Ser. No. 07/200,025 incorporated herein. A feedback path as described therein is also provided from the microprocessor 40 to the multiplexer 34. The digital output signal from the microprocessor 40 is applied to a digital to analog converter 42. The digital to analog converter thereby develops a controller output signal. Therefore, the combination of the elements between the multiplexer 34 and the digital to analog converter 42 within the developing means 30 may be termed, for purposes herein, a controller 44 which is responsive to the displacement between the sprung mass and the unsprung mass, the first time derivative and a second time derivative of that displacement which are derived from the signals generated by the LVDT 34 and accelerometer 32. The controller output signal is applied to a current amplifier 46 which develops the control current for application to the coil 26.

So that the control current only opposes motion of the spring mass relative to the road surface occurring below a selected frequency in accordance with the principles of the present invention, the developing means 30 further includes a high pass filter 48. The high pass filter 48 is electrically connected in parallel with the coil 26 and has a cutoff frequency substantially equivalent to the selected frequency. The selected frequency is chosen to be commensurate with the crossover frequency described in reference to FIG. 3.

The high pass filter 48 includes a capacitor 50 having a selected capacitance and a resistor 52 electrically coupled in series with the capacitor 50 and having a selected resistance. In operation, the control current applied to the coil 26 for frequency components below the selected frequency are applied to the coil. For those frequency components of the control current above the selected frequency of the high pass filter 48, such components are shunted to ground.

An induced current in the coil 26 is developed when the coil 26 moves through the flux of the magnetic element 28 in response to the motion of the sprung and unsprung masses relative to each other. Generally, the induced current has mostly high frequency components which are shunted to ground through the high pass filter 48. It should be noted that the current amplifier 46 has an output impedance substantially greater than the input impedance to the high pass filter 48 such that most of the induced current in the coil 26 is shunted through the high pass filter 48.

As is known, the induced current in the coil 26 is proportional to the relative velocity between the coil 26 and the flux developed by the magnetic element 28. Therefore, the induced current is also proportional to the velocity of the sprung mass relative to the unsprung mass. The electromotive force caused by the induced current and acting on the magnetic element 28 to oppose its relative motion to the coil 26 is equal to the product of the induced current, the magnetic flux density and the inductance of the coil 26. Since this force is a linear function of the induced current which is, in turn, proportional to the velocity, the electromotive force opposing the relative motion is also linearly proportional to velocity and is a true damping force. The level of the damping force is also proportional to the amplitude of the induced current, this amplitude being determined by the resistor 52. Therefore, the resistance of the resistor 52 is then selected to adjust the level of this electromotive to achieve the desired damping level. Once the value of resistor 52 is chosen, the capacitance of the capacitor 50 is then selected so that the RC time constant of the resistor 52 and capacitor 50 is commensurate with the selected frequency.

There has been described hereinabove a novel active damping system for use in a vehicle suspension. Those skilled in the art may now make numerous uses of and departures from the above-described embodiment with departing from the inventive concepts described herein. For example, the present invention has been described in conjunction with a strut type suspension. It is within the ordinary skill in the art to adapt the active damping system to other suspension systems including double wishbone, A-arm and trailing arm suspensions. One skilled in the art would replace the passive damper with the active damping system disclosed herein. Also, the spring 22 need not be a coil spring as disclosed but also be a pneumatic spring a torsion bar, or a longitudinal or transverse leaf spring. Accordingly, the present invention is to be defined solely by the scope of the following claims.

I claim:

1. In a vehicle having an unsprung mass subject to random input vibrations from a road surface, a sprung mass and a spring supporting said sprung mass on said unsprung mass, an active damping system comprising:
    an electrical current conducting coil spatially fixed with respect to one of said sprung mass and said unsprung mass;
    a magnetic element spatially fixed with respect to one other of said sprung mass and said unsprung mass so that relative motion is imparted between said coil and said element in response to relative motion between said sprung mass and said unsprung mass; and
    circuit means for developing an induced current in said coil in response to said relative motion between said coil and said magnetic element wherein said magnetic element develops magnetic flux intersecting said coil and further wherein said induced current develops an electromotive force on said magnetic element opposing said relative motion.

2. The active damping system of claim 1 wherein said electromotive force is a function of velocity of said unsprung mass relative to said sprung mass.

3. The active damping system of claim 2 wherein said circuit means includes means for adjusting an amplitude of said induced current to control a level of said electromotive force.

4. The active damping system of claim 3 wherein said adjusting means includes a resistor electrically coupled to said coil and a current path of said induced current.

5. The active damping system of claim 1 wherein said current means includes means for limiting said induced current to frequencies above a selected frequency.

6. The active damping system of claim 5 wherein said limiting means includes a high pass filter having a cutoff frequency commensurate with said selected frequency, said high pass filter being electrically coupled to said coil in a current path of said induced current.

7. The active damping system of claim 6 wherein said high pass filter includes:
    a resistor having a selected resistance; and
    a capacitor having a selected capacitance and being serially coupled to said resistor in said current path, said resistance and said capacitance being selected to have an RC time constant commensurate with said cutoff frequency.

8. The active damping system of claim 1 further comprising:
    means for developing a control current through said coil to oppose motion of said sprung mass relative to said road surface occurring below a selected frequency.

9. The active damping system of claim 8 wherein said developing means includes:
    a controller responsive to each of a displacement of said sprung mass from said unsprung mass, and a second time derivative of said displacement to develop a controller output signal; and
    a current amplifier to which said controller output signal is applied to develop said control current.

10. In a vehicle having an unsprung mass subject to random input vibration from a road surface, a sprung mass and a spring supporting said sprung mass on said unsprung mass, an active damping system comprising:

an electrical current conducting coil spatially fixed with respect to one of said sprung mass and said unsprung mass;

a magnetic element spatially fixed with respect to one other of said sprung mass and said unsprung mass so that relative motion is imparted between said coil and said element in response to relative motion between said sprung mass and said unsprung mass, said magnetic element developing magnetic flux intersecting said winding to develop an induced current through said coil in response to said relative motion between said coil and said element wherein said induced current develops an electromotive force on said magnetic element opposing said relative motion; and means for developing a control current through said coil to oppose motion of said sprung mass relative to said road surface occurring below a selected frequency.

11. The active damping system of claim 10 wherein said developing means includes:

a high pass filter being electrically connected in parallel with said coil and having a cutoff frequency substantially equivalent to said selected frequency, said induced current being electrically coupled through said high pass filter.

12. The active damping system of claim 11 wherein said high pass filter includes:

a capacitor having a selected capacitance; and a resistor being electrically coupled in series with said capacitor and having a selected resistance, said resistance being selected to limit an amplitude of said induced current to control a level of said electromotive force.

13. The active damping system of claim 10 wherein said developing means includes:

a controller responsive to each of the displacement of said sprung mass from said unsprung mass, a first time derivative of said displacement and a second time derivative of said displacement to develop a controller output signal; and a current amplifier to which said controller output signal is applied to develop said control current.

14. The active damping system of claim 10 wherein said electromotive force is proportional to velocity of said sprung mass relative to said unsprung mass.

15. In a vehicle having an unsprung mass subject to random input vibration from a road surface, a sprung mass and a spring supporting said sprung mass on said unsprung mass, an active damping comprising:

an electrical current conducting coil spatially fixed with respect to one of said sprung mass and said unsprung mass;

a magnetic element spatially affixed with respect to one other of said sprung mass and said unsprung mass so that relative motion is imparted between said coil and said element in respect to relative motion between said sprung mass and said unsprung mass;

circuit means for developing an induced current in said coil in response to said relative motion between said coil and said magnetic element wherein said magnetic element develops magnetic flux intersecting said coil and further wherein said induced current develops an electromotive force on said magnetic element opposing said relative motion, said circuit means further including means for limiting said induced current to frequencies above a selected frequency; and means for developing a control current through said coil to oppose motion of said sprung mass relative to said road surface occurring below said selected frequency.

16. The active damping system of claim 15 wherein said electromotive force is a function of velocity of said unsprung mass relative to said sprung mass.

17. The active damping system of claim 15 wherein said circuit means includes means for adjusting an amplitude of said induced current to control a level of said electromotive force.

18. The active damping system of claim 17 wherein said adjusting means includes a resistor electrically coupled to said coil and a current path of said induced current.

19. The active damping system of claim 15 wherein said limiting means includes a high pass filter having a cutoff frequency commensurate with said selected frequency, said high pass filter being electrically coupled to said coil in a current path of said induced current.

20. The active damping system of claim 19 wherein said high pass filter includes:

a resistor having a selected resistance; and a capacitor having a selected capacitance and being serially coupled to said resistor in said current path, said resistance and said capacitance being selected to have an RC time constant commensurate with said cutoff frequency.

21. The active damping system as set forth in claim 15 wherein said developing means includes:

a controller responsive to each of a displacement of said sprung mass from said unsprung mass and a second time derivative of said displacement to develop a controller output signal; and a current amplifier to which said controller output signal is applied to develop said control current.

* * * * *